July 30, 1957  A. S. HARBOUR ET AL  2,800,805
TRANSMISSION CONTROL

Filed Nov. 4, 1952  4 Sheets-Sheet 1

Inventors
Albert S. Harbour, &
Albert E. Leach
By Willits, Helwig & Baillio
Attorneys

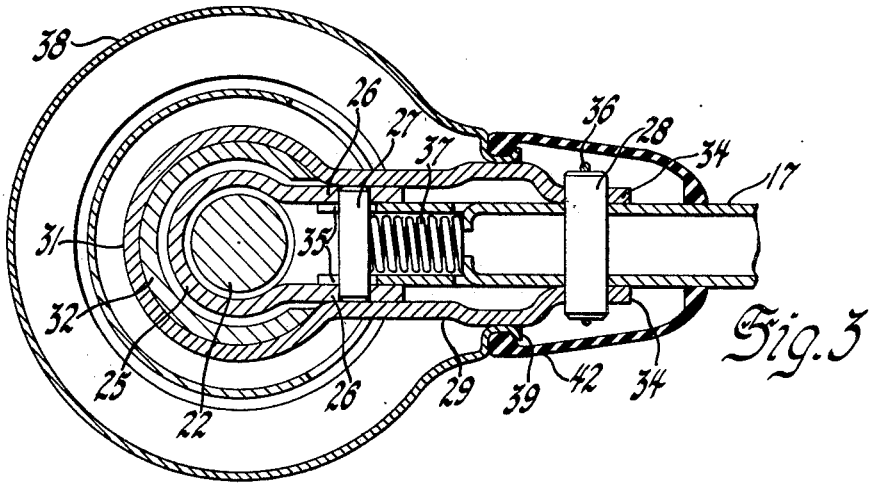
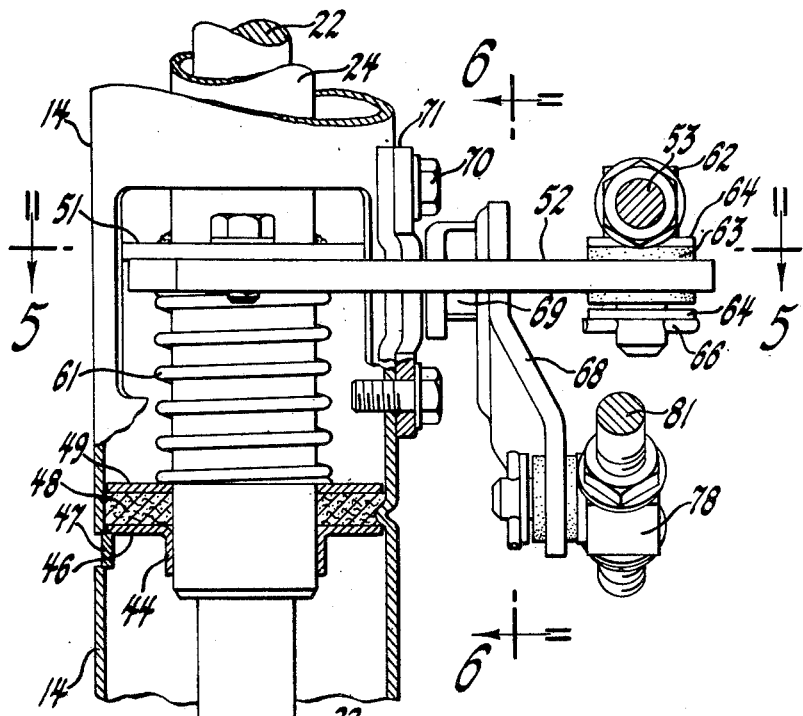

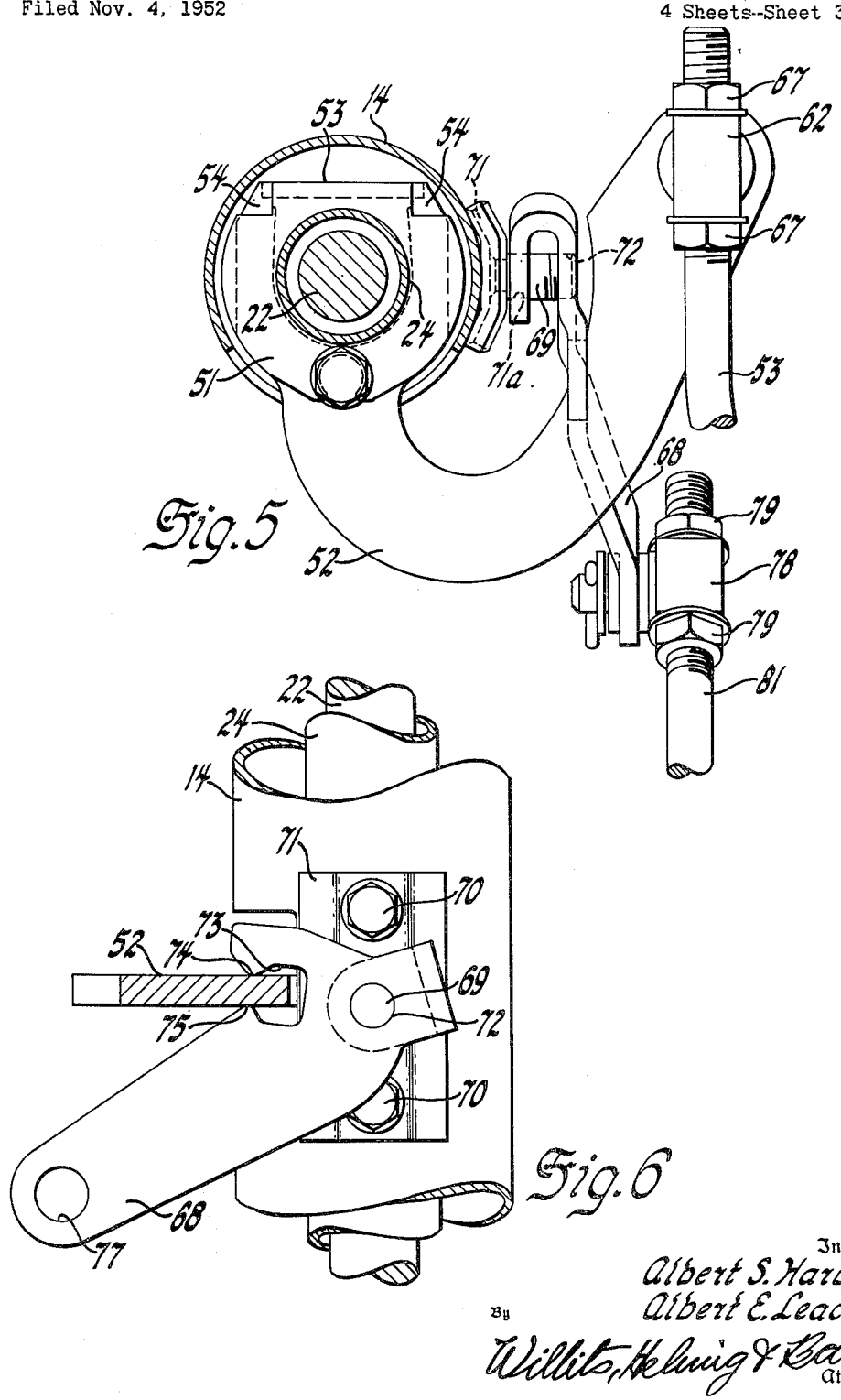

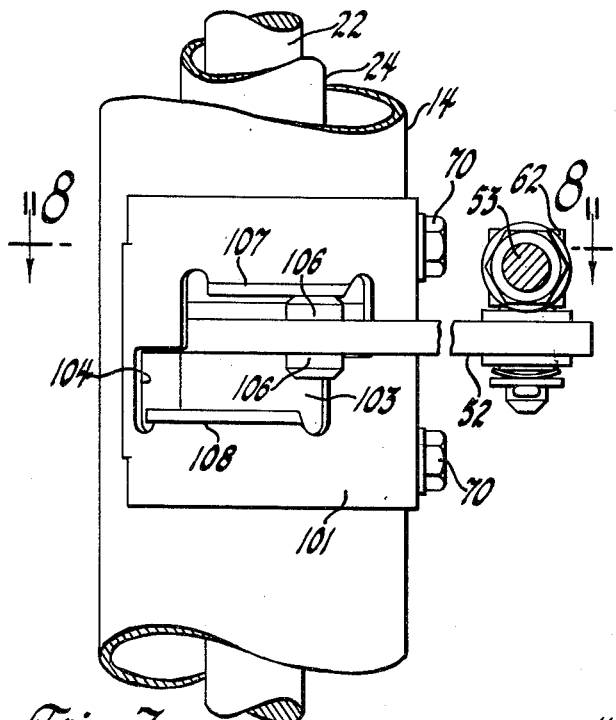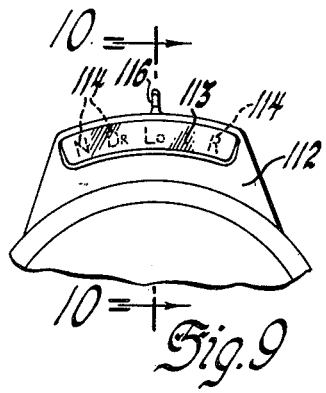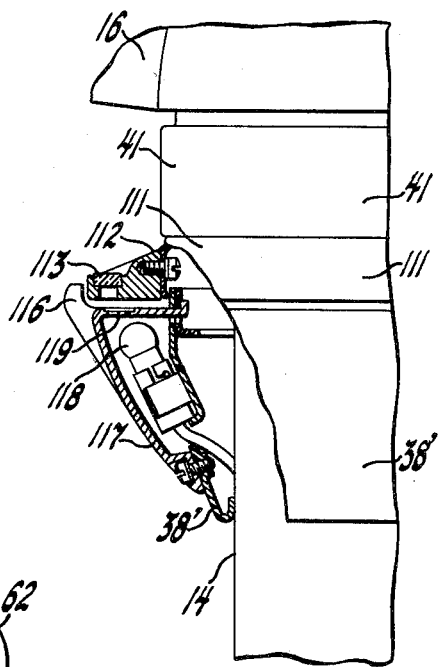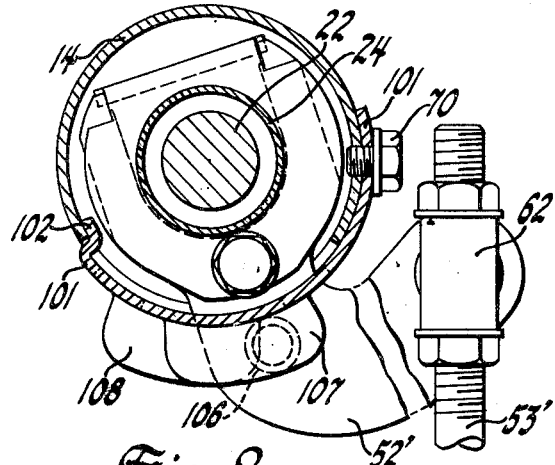

United States Patent Office 2,800,805
Patented July 30, 1957

2,800,805

TRANSMISSION CONTROL

Albert S. Harbour, Pontiac, and Albert E. Leach, Royal Oak, Mich., assignors to General Motors Corporation, Detroit, Mich., a corporation of Delaware Application November 4, 1952, Serial No. 318,694

14 Claims. (Cl. 74—484)

Our invention relates to automotive transmission controls and more particularly to improved arrangements for transmission of control settings from a lever on the steering column of a motor vehicle to a transmission of either a selective sliding gear type or an automatic type.

The principal objects of the invention are to provide improved control mechanisms of this sort, to provide a mechanism which is adaptable with a minimum of structural changes in a vehicle to use with either manually shifted or automatic transmissions, and to provide an arrangement which is strong, easy to manipulate, and convenient for assembly and service.

A feature of the invention is that a control arm rotatable about the axis of the steering shaft is used for both manual shift and automatic transmissions, and an additional control arm which is required for the manually shifted transmission is moved by movement axially of the steering column of the first-mentioned control arm.

The nature of the invention and the objects and advantages thereof, will be better understood by reference to the accompanying drawings in which:

Fig. 3 is a transverse sectional view taken on the plane indicated in Fig. 2;

Fig. 4 is a view taken at right angles to the axis of the steering column showing the shift control mechanism adjacent the lower end thereof;

Fig. 5 is a cross-sectional view taken on the plane indicated in Fig. 4;

Fig. 6 is a view partly in section taken on the plane indicated in Fig. 4;

Fig. 7 is a view corresponding to that of Fig. 4 illustrating a second embodiment of the invention for use with an automatic transmission;

Fig. 8 is a cross-section of the same taken on the plane indicated at Fig. 7;

Fig. 9 is a fragmentary view of the upper end of the steering column taken on a plane at right angles to the axis of the steering column illustrating the shift lever position indicator dial; and, Fig. 10 is a partial sectional view taken on the plane indicated in Fig. 9 and illustrating principally the shift dial illuminator.

Figure 1:
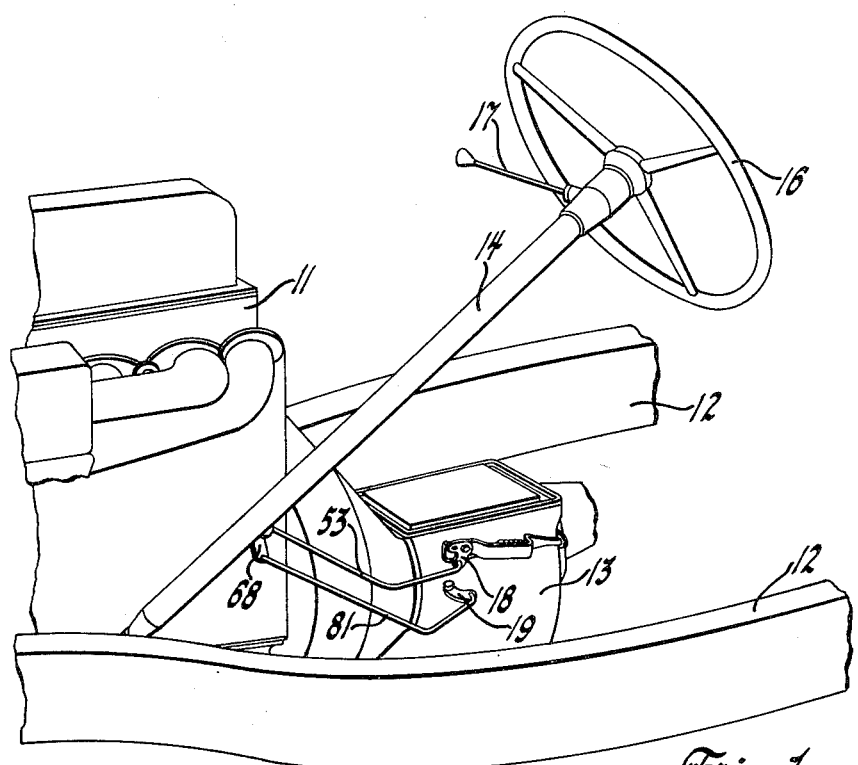
Fig. 1 is a fragmentary view of an automobile chassis illustrating the location of the control mechanism.

Referring first to Fig. 1, which illustrates the general arrangement of the transmission and steering column in a conventional motor vehicle, the engine 11 is supported by frame 12. Cantilevered from the engine is a gearbox or transmission 13. The steering column 14 supported on the frame mounts at its upper end a steering wheel 16 and a transmission control lever 17. The gearbox 13 may be of the known selective sliding gear type with three speeds forward and one speed in reverse, controlled by a shifter lever 18 and a selector lever 19. The selector lever selects the shifter fork to which the shift lever is connected, so as to shift between reverse and first gear or between second and third gears. The embodiment of the invention illustrated in Figs. 2 to 6 provides for the control of a gear box such as that illustrated in 13 by rotary motion of the lever 17 about the steering column axis and vertical movement of the lever in the conventional H-shift.

Figure 2:
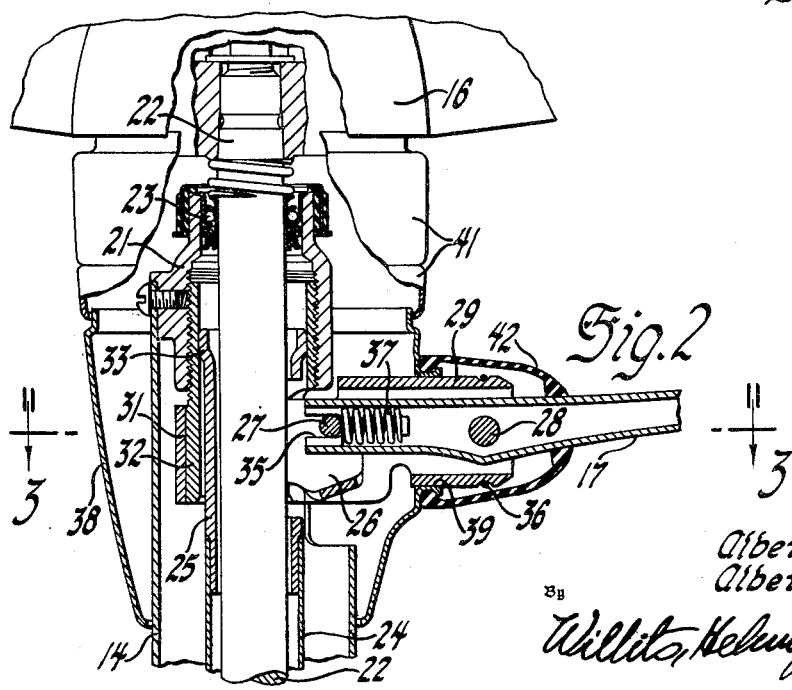
Fig. 2 is a view, principally in section on a plane containing the axis of the steering column, illustrating the mechanism at the upper end of the column.

Referring to Figs. 2 and 3, the tubular steering column 14 mounts at its upper end a bearing support 21 in which the upper end of the steering shaft 22 is supported by ball bearing 23. The steering wheel 16 is mounted on the shaft by conventional means. The transmission control movements are transmitted by the control tube 24 which may rotate about the axis of the steering shaft and reciprocate along the axis of the shaft. Welded to the upper end of the control tube is a generally tubular fitting 25 from which extend laterally two ears 26 defining a fork across which extends a pin 27 by which the control tube is connected for longitudinal movement to the manually operated lever 17. The lever 17 is fulcrumed on a pin or shaft 28 mounted in a generally tubular formed metal bracket 29, which bracket includes a strap portion 31 which extends around and is brazed or otherwise fixed to a sleeve 32. The upper end of sleeve 32 is externally threaded and is mounted in internal threads in the bearing support 21, the threads thus providing a bearing for the sleeve 32 so that it is supported in the upper end of the steering column and is free to rotate. The upper end of the fitting 25 on the control tube 24 is flared as indicated at 33 so that it is guided within the sleeve 32. As will be apparent, rotation of the lever 17 in the plane of Fig. 2 about the fulcrum 28 will raise and lower the control tube 24. As will be more clearly apparent from Fig. 3, rotation of the lever 17 in the plane of that figure will rotate the brackets 29, 31, sleeve 32, fitting 25, and control tube 24 about the axis of the steering shaft 22.

Referring more particularly to Fig. 3, it will be noted that the control lever 17, which is preferably of rectangular cross section at the fulcrum 28, is closely embraced by the forks 34 of the bracket 29. Likewise, the ears 26 are guided closely for sliding movement between the sides of the bracket 29, and the inner end of the lever 17, the sides of which are clevised as indicated at 35 to embrace the pin 27, is mounted with only operating clearance between the ears 26. It will be noted that the pin 27 is retained by the bracket 29 and the pin 28 by a snap ring 36. A compression spring 37 mounted between the pin 27 and projections struck in from the wall of the lever 17 acts to prevent rattling of the parts. As will be apparent, the arrangement of the lever 17, bracket 29, and fitting 26 insure accurate rotational movement of the tube 24 in accordance with rotation of the lever 17 about the steering column axis.

The mechanism just described may be enclosed in a concealing housing of attractive form which may comprise a generally conical lower portion 38 formed with a flanged opening 39 for the fulcrum bracket 29, and an upper shell or shells 41 between the shell 38 and the steering wheel, the shells 41 being fixed in suitable manner on the column 14. These housings may enclose other mechanism such as turn signal switches and the like which are not illustrated, since they are not material to the invention which is the subject of this application. A flexible thimble of rubber or the like 42 fits over the lever 17 and is mounted on the flange 39 of the housing 38.

As will be understood, the steering shaft 22 extends through the steering column 14 to a steering mechanism which is not illustrated, being immaterial to the present invention, and the control tube 24 extends to a point near the lower end of the steering column where it is supported in a bearing sleeve 44 which is integral with a flange 46 supported in the column 14 by knocked-in abutments 47. An oil soaked felt washer 48 mounted between the flange 46 and a metal washer 49 serves as a seal and to provide lubrication for the bearing 44. A collar or key 51, welded to the tube 24, provides a mounting for the shifter arm 52 which is connected by a rod 53 (see also Fig. 1) to the shifter lever 18 of the transmission.

The collar 51 is roughly circular and is bent downwardly on the forward edge at 53. The arm 52 is made with a forked end which straddles the tube 24 and the end portions 54 of which straddle the bent-down part 53 of the collar 51. A cap screw 56 passing through a hole in the collar 51 and threaded into a tapped hole in the arm 52 holds the arm in place on the collar. It will be seen that the arm is thus easily assembled to the tube.

A compression spring 61 mounted between the collar 51 and washer 49 supports the control tube 24. As will be most clearly apparent from Fig. 5, the shift control arm 52 extends from the rear or lower side of the steering column and curves around in approximately a semicircle so that its outer end is abreast of the right side of the column. A trunnion fitting 62 is supported in the outer end of the arm by a resilient grommet 63, washers 64, and a cotter key 66 on the stem of the trunnion fitting extending through the grommet 63. The forward end of the rod 53 extends through the barrel of the fitting 62 and may be adjusted therein by nuts 67 threaded on the end of the rod. As will be apparent, rotation of the shift lever 17 around the axis of the column is transmitted through the tube 24 to lever 52 which reciprocates the rod 53 to rotate the shifter lever 18 of the transmission.

Motion of the control tube 24 longitudinally of the steering column moves the lever 52 longitudinally of the steering column. This movement of the lever 52 is transmitted to a selector control arm 68 rotatably mounted on a stud 69 extending at right angles to the axis of the steering column. The stud 69 is riveted to a bracket 71 fixed on the column 14 by cap screws 70. The end of the lever 68 which is supported on the pin 69 is recurved to provide two bearing surfaces, inner bearing surface at 71a (Fig. 5) being cylindrical and the outer surface at 72 being threaded so that the arm is threaded onto the stud 69 and retained thereon by the threads. As will be most clearly apparent in Figs. 4 and 6, the arm 68 is slotted at 73 to provide a jaw, the opposing surfaces 74 and 75 which engage the upper and lower surfaces of the shifter arm 52, so that the up and down movement of the arm 52 swings the arm 68 around its pivot on the pin 69. As will be apparent, the arcuate form of the inner edge of the lever 52 is such that it maintains constant engagement with the jaws 74, 75 through its range of rotational movement. The outer end of arm 68 is provided with a hole 77 for a grommet by means of which a trunnion fitting 78 is mounted on the arm. The trunnion fitting 78 may be identical to the fitting 62 and is adjustably connected by means of nuts 79 to the selector rod 81 (see also Fig. 1), which connects to the selector lever 19 of the transmission. As will be apparent, therefore, movement of the lever 17 toward or away from the steering wheel through vertical movement of control tube 24 and lever 52 rocks lever 68 to select the desired range in the transmission.

Considering now the modified form of the invention adapted for use with an automatic transmission in which only one control lever on the transmission is actuated from the steering column control lever 17; Figs. 7 to 10 show parts of this form of the invention which differ from or are in addition to the corresponding parts shown in Figs. 1 to 6. As will be understood, the general layout will be similar to that shown in Fig. 1 except that the selector control lever 19, rod 81, and arm 68 are omitted. The range selection of the automatic transmission will be effected by the arm corresponding to arm 18 of Fig. 1 which will be connected by rod 53' (Figs. 7 and 8) to an arm 52', similar in form and mounting to the previously described arm 52 and fixed to the control tube 24. The control tube is mounted at the upper and lower ends by the same structure as previously described, and moved by the same mechanism.

The connection between the rod 53' and arm 52' may be made by a trunnion fitting 62 and other incidental parts as previously described. The mounting bracket 71 for the arm 68 of the previous form is omitted and is replaced by a guide and detent plate 101 secured by cap screws 70 in the same manner as the bracket 71. The plate 101 covers an opening in the rear or under wall of the steering column and the outer end of the plate is constituted by a lip or lips 102 which engage within the column. Plate 101 is provided with an opening 103 therein generally in the form of two offset rectangles so that the upper part of the opening constitutes means to limit the travel of the arm 52' to the normal range of movement for forward driving. By depressing the tube 24, the arm 52' can be caused to move into the portion 104 of the opening 103 corresponding to reverse selection in the "Hydramatic" transmission. The arm 52' is provided on its upper and lower surfaces with bumpers 106 of rubber or other resilient material which may engage outwardly bent lips or guides 107 and 108 extending from the plate 101. When the upper bumper 106 engages the guide 107, the arm may have its maximum swing to the right as shown in Fig. 7. To move the arm to the reverse position, it is moved downwardly to enter the slot 104, and the lower bumper 106 engages the guide 108.

With the automatic transmission, it is customary to provide an indicator for the position of the shift control lever 17. This may be provided by structure such as that shown in Figs. 9 and 10. The housing at the upper end of the steering column comprises a casing 38' corresponding to the casing 38 previously described, rotating with the lever 17 and tube 24, a housing 41, and an intermediate ring or collar 111, which is supported in any convenient manner from the upper end of the steering column 14 so as to be stationary. A shelf or bracket 112 within which is a transparent or translucent window 113 bearing appropriate indicia as indicated at 114 is mounted on the stationary ring 111. The position of the control lever 17 is indicated by a pointer or index 116 which forms a part of a light housing 117 screwed to the housing 38' which rotates with the lever 17 about the axis of the column. A small light bulb 118 mounted in a socket in the housing 117 shines through an opening 119 in the upper surface of the housing to illuminate the indicium opposite which the pointer 116 may be at any time. As will be apparent, the transmission which may be similar in appearance to that designated as 13 in Fig. 1, may be controlled by moving the lever 17 about the axis of the steering column. Inadvertent movement of the lever into reverse position, which is the farthest clockwise in Fig. 10, is prevented, inasmuch as it is necessary to lift the lever and thus depress the control tube 24 so that the control arm 52' can enter the opening 104, to shift into reverse gear.

It will be apparent that the invention provides very satisfactory means for transmission control in automobiles in which both manually shifted and automatic transmissions are available as optional equipment, since the addition or replacement of a relatively small number of parts will fit the control linkage for either type of transmission installation.

We claim:
1. In an automobile, in combination, a transmission, control means thereon, a steering column, a transmission control lever at the upper end thereof, means for transmitting motion of the transmission control lever in two dimensions through the steering column, means remote from the upper end of the steering column connected to the transmitting means, means connecting the last-mentioned means to the transmission control means for control thereof, and means cooperating with the trans- mitting means so that its range of movement in one dimension is dependent on its position in the other dimension.

2. In an automotive vehicle or the like, transmission control mechanism comprising, in combination, a steering column, manually operable control means at the upper end of the column, a member guided for reciprocation and rotation within the steering column and extending from the manually operable control means to a point remote therefrom, an arm mounted on the said member and extending from the steering column, means adapted to connect the outer end of the arm to the transmission of the vehicle for control thereof, a second arm rotatable in a plane substantially at right angles to the plane of rotation of the first arm, and means on the steering column defining an axis of rotation for the second arm, the second arm having jaws embracing the first arm whereby reciprocation of the control member and of the first arm thereby rotates the second arm about the said axis, and means adapted to connect the second arm to the said transmission for control thereof.

3. In an automotive vehicle or the like, transmission control mechanism comprising, in combination, a steering column, manually operable control means at the upper end of the column, a member guided for reciprocation and rotation within the steering column and extending from the manually operable control means to a point remote therefrom, an arcuate arm mounted on the said member and extending from the steering column, means adapted to connect the outer end of the arm to the transmission of the vehicle for control thereof, a bracket on the steering column adjacent the said arm, a second arm rotatable in a plane substantially at right angles to the plane of rotation of the first arm, and means on the bracket defining an axis of rotation for the second arm, the second arm having jaws embracing the arcuate first arm whereby reciprocation of the control member and of the first arm thereby rotates the second arm about the said axis, and means adapted to connect the second arm to the said transmission for control thereof.

4. In an automotive vehicle or the like, transmission control mechanism comprising, in combination, a steering column, manually operable control means at the upper end of the column, a member guided for reciprocation and rotation within the steering column and extending from the manually operable control means to a point remote therefrom, an arcuate arm mounted on the said member and extending from the steering column, means defining a bearing for the lower end of the member, a compression spring between the bearing means and the arm mounted on the member urging the control member upwardly, means adapted to connect the outer end of the arm to the transmission of the vehicle for control thereof, a bracket on the steering column adjacent the said arm, a second arm rotatable in a plane substantially at right angles to the plane of rotation of the first arm, and means on the bracket defining an axis of rotation for the second arm, the second arm having jaws embracing the arcuate first arm whereby reciprocation of the control member and of the first arm thereby rotates the second arm about the said axis, and means adapted to connect the second arm to the said transmission for control thereof.

5. In a transmission control mechanism for an automotive vehicle or the like, in combination, a steering column, a steering shaft extending therethrough, a control tube extending therethrough about the steering shaft, a fitting fixed on the upper end of the steering column, a bracket rotatable about the axis of the control tube, means within the fitting defining radial and axial bearings for the bracket means within the fitting and bracket defining guide surfaces between the bracket and the control tube for relative reciprocation thereof, a control lever mounted in the bracket with freedom for movement in a plane passing through the axis of the steering column, means on the control tube engaging the lever for reciprocation of the control tube longitudinally of the steering column, and means on the control tube engaging the lever for rotation of the control tube with the lever.

6. In a transmission control mechanism for an automotive vehicle or the like, in combination, a steering column, a steering shaft extending therethrough, a control tube extending therethrough about the steering shaft, a fitting at the upper end of the steering column, means in the fitting defining a bearing for the steering shaft, a bracket rotatable about the axis of the control tube, means within the fitting defining radial and axial bearings for the bracket, a sleeve on the end of the control tube, means within the fitting and bracket defining guide surfaces between the bracket and the sleeve for relative reciprocation thereof, the bracket including an arm extending therefrom, a control lever mounted in the arm with freedom for movement in a plane passing through the axis of the steering column, means on the sleeve engaging the lever for reciprocation of the control tube longitudinally of the steering column, and means on the control tube engaging the bracket for rotation of the control tube with the bracket, the bracket being adapted to be rotatable about the axis of the steering column by the control lever.

7. In a transmission control mechanism for an automotive vehicle or the like, in combination, a steering column, a steering shaft extending therethrough, a control shaft extending therethrough, a fitting at the upper end of the steering column, means in the fitting defining a bearing for the steering shaft, a bracket rotatable about the axis of the control shaft, means within the fitting defining radial and axial bearings for the bracket, means within the fitting and bracket defining guide surfaces between the bracket and the control shaft for relative reciprocation thereof, the bracket including an arm extending therefrom, a control lever mounted in the arm with freedom for movement in a plane passing through the axis of the steering column, means in the control shaft engaging the lever for reciprocation of the control shaft longitudinally of the steering column, and means on the control shaft engaging the bracket for rotation of the control shaft with the bracket, the bracket being rotatable about the axis of the control shaft by the control lever.

8. In a transmission control mechanism for an automotive vehicle or the like, in combination, a steering column, a steering shaft extending therethrough, a control tube extending therethrough about the steering shaft, a fitting at the upper end of the steering column, means in the fitting defining a bearing for the steering shaft, a bracket rotatable about the axis of the control tube, means within the fitting defining radial and axial bearings for the bracket, means within the fitting and bracket defining guide surfaces between the bracket and the control tube for relative reciprocation thereof, the bracket including an arm extending therefrom, a control lever mounted in the arm with freedom for movement in a plane passing through the axis of the steering column, means in the control tube engaging the lever for reciprocation of the control tube longitudinally of the steering column, means on the control tube engaging the bracket for rotation of the control tube with the bracket, the bracket being rotatable about the axis of the steering column by the control lever, and the connection between the control lever and the control tube comprising antirattle means.

9. In an automotive vehicle or the like, transmission control mechanism comprising, in combination, a steering column, manually operable control means at the upper end of the column, a member guided for reciprocation and rotation within the steering column and extending from the manually operable control lever to a point remote therefrom, an arm mounted on the said member and extending from the steering column, means defining a bearing for the lower end of the member, a compression spring between the bearing means and the arm mounted on the member urging the control member upwardly, means adapted to connect the outer end of the arm to the transmission of the vehicle for control thereof, and means cooperating with the said arm to coordinate the rotary and reciprocating motions of the said member.

10. In an automotive vehicle or the like, transmission control mechanism comprising, in combination, a steering column, manually operable control means at the upper end of the column, a member guided for reciprocation and rotation within the steering column and extending from the manually operable control means to a point remote therefrom, an arm mounted on the said member and extending from the steering column, means adapted to connect the outer end of the arm to the transmission of the vehicle for control thereof, a plate mounted on the steering column and having an opening therein defining an ambit of movement for the said arm, the plate also having guide surfaces extending radially therefrom, and resilient means on the arm adapted to engage the guide surfaces and thereby limit longitudinal movement of the control means, the opening comprising an offset portion permitting rotation of the arm beyond the normal range thereof upon compression of the spring.

11. In an automotive vehicle or the like, transmission control mechanism comprising, in combination, a steering column, manually operable control means at the upper end of the column, a member guided for reciprocation and rotation within the steering column and extending from the manually operable control means to a point remote therefrom, an arm mounted on the said member and extending from the steering column, means adapted to connect the outer end of the arm to the transmission of the vehicle for control thereof, a plate mounted on the steering column and having an opening therein defining an ambit of movement for the said arm, the plate also having guide surfaces extending radially therefrom, and resilient means on the arm adapted to engage the guide surfaces and thereby limit longitudinal movement of the control means.

12. In an automotive vehicle or the like, transmission control mechanism comprising, in combination, a steering column, manually operable control means at the upper end of the column, a member guided for reciprocation and rotation within the steering column and extending from the manually operable control means to a point remote therefrom, an arm mounted on the said member and extending from the steering column, means defining a bearing for the lower end of the member, a compression spring between the bearing means and the arm mounted on the member urging the control member upwardly, means adapted to connect the outer end of the arm to the transmission of the vehicle for control thereof, a plate mounted on the steering column and having an opening therein defining an ambit of movement for the said arm, the plate also having guide surfaces extending radially therefrom, and means on the arm adapted to engage the guide surfaces and thereby limit longitudinal movement of the control means.

13. In an automotive vehicle or the like, transmission control mechanism comprising, in combination, a steering column, manually operable control means at the upper end of the column, a member guided for reciprocation and rotation within the steering column and extending from the manually operable control lever to a point remote therefrom, an arm mounted on the said member and extending from the steering column, means defining a bearing for the lower end of the member, a compression spring between the bearing means and the arm mounted on the member urging the control member upwardly, means adapted to connect the outer end of the arm to the transmission of the vehicle for control thereof, a plate mounted on the steering column and having an opening therein defining an ambit of movement for the said arm, the plate also having guide surfaces extending radially therefrom, and resilient means on the arm adapted to engage the guide surfaces and thereby limit longitudinal movement of the control means, the opening comprising an offset portion permitting rotation of the arm beyond the normal range thereof upon compression of the spring.

14. In an automotive vehicle or the like, transmission control mechanism comprising, in combination, a steering column, a rotatable shaft mounted within the steering column, an arm extending from the steering column, means for coupling the arm to the shaft comprising a collar on the shaft, a part extending from a side of the collar, a fork on the arm adapted to straddle the shaft and closely straddle the said part, and means for fixing the arm to the collar at a point spaced from the said part, the arm being adapted to be connected to a transmission mechanism of the vehicle for control thereof.

References Cited in the file of this patent

UNITED STATES PATENTS

| | | |
|---|---|---|
| 2,235,975 | Best | Mar. 25, 1941 |
| 2,282,962 | Hawkins | May 12, 1942 |
| 2,301,484 | Wahlberg | Nov. 10, 1942 |
| 2,631,467 | Lincoln | Mar. 17, 1953 |
| 2,638,013 | Dodt | May 12, 1953 |
| 2,696,126 | Lincoln | Dec. 7, 1954 |